(12) United States Patent
Kirkpatrick et al.

(10) Patent No.: US 6,356,191 B1
(45) Date of Patent: Mar. 12, 2002

(54) ERROR COMPENSATION FOR A PROCESS FLUID TEMPERATURE TRANSMITTER

(75) Inventors: William R. Kirkpatrick, Faribault; Eric D. Rotvold, Inver Grove Heights, both of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/335,212

(22) Filed: Jun. 17, 1999

(51) Int. Cl.$^7$ .......................... G08B 23/00; G01K 1/00
(52) U.S. Cl. ...................... 340/501; 340/508; 340/507; 340/588; 340/589; 374/100; 702/53; 702/99; 702/130; 702/133
(58) Field of Search ................................ 340/501, 508, 340/509, 506, 510, 511, 588, 589; 702/53, 54, 64, 99 E, 130, 133; 73/719, 708; 374/100; 700/9–12

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 234/194 |
| 3,468,164 A | 9/1969 | Sutherland | 73/343 |
| 3,590,370 A | 6/1971 | Fleischer | 324/51 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A * | 7/1978 | Talpouras | 73/362 |
| 4,122,719 A * | 10/1978 | Carlson et al. | 73/342 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |

(List continued on next page.)

FOREIGN PATENT DOCUMENTS

| | | |
|---|---|---|
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |

(List continued on next page.)

OTHER PUBLICATIONS

*Instrument Engineers' Handbook,* Chapter IV entitled "Temperature Measurements", by T.J. Claggett, pp. 266–333, Jan. 1982.

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

(List continued on next page.)

*Primary Examiner*—Donnie L. Crosland
(74) *Attorney, Agent, or Firm*—Westman, Champlin & Kelly, P.A.

(57) ABSTRACT

A process fluid temperature transmitter includes circuitry that improves compensation of error due to the presence of one or more non-associated voltage sources in a resistance temperature device (RTD) circuit. A method of compensating for such error is also provided.

19 Claims, 8 Drawing Sheets

U.S. PATENT DOCUMENTS

| | | | |
|---|---|---|---|
| 4,517,468 A | 5/1985 | Kemper et al. | 290/52 |
| 4,530,234 A | 7/1985 | Cullick et al. | 73/53 |
| 4,571,689 A | 2/1986 | Hildebrand et al. | 364/481 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,707,796 A | 11/1987 | Calabro et al. | 364/552 |
| 4,736,367 A | 5/1988 | Wroblewski et al. | 370/85 |
| 4,777,585 A | 10/1988 | Kokawa et al. | 364/164 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/551.01 |
| 5,130,936 A | 7/1992 | Sheppard et al. | 364/551.01 |
| 5,134,574 A | 7/1992 | Beaverstock et al. | 364/551.01 |
| 5,137,370 A * | 8/1992 | McCullock et al. | 374/183 |
| 5,142,612 A | 8/1992 | Skeirik | 395/11 |
| 5,143,452 A * | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/467 |
| 5,265,222 A | 11/1993 | Nishiya et al. | 395/3 |
| 5,268,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 395/23 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Kolubek | 324/713 |
| 5,469,156 A | 11/1995 | Kogura et al. | 340/870.38 |
| 5,469,735 A | 11/1995 | Waanabe | 73/118.1 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,548,528 A | 8/1996 | Keeler et al. | 364/497 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,598,521 A | 1/1997 | Kilgore et al. | 395/326 |
| 5,600,148 A | 2/1997 | Cole et al. | 250/495.1 |
| 5,623,605 A | 4/1997 | Keshav et al. | 395/200.17 |
| 5,637,802 A | 6/1997 | Frick et al. | 73/724 |
| 5,640,491 A | 6/1997 | Bhat et al. | 395/22 |
| 5,665,899 A | 7/1997 | Willcox | 73/1.63 |
| 5,661,668 A | 8/1997 | Yemini et al. | 364/550 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Loew et al. | 340/608 |
| 5,700,090 A | 12/1997 | Eryurek | 374/210 |
| 5,703,575 A | 12/1997 | Kirpatrick | 340/870.17 |
| 5,704,011 A | 12/1997 | Hansen et al. | 395/22 |
| 5,705,978 A | 1/1998 | Frick et al. | 340/511 |
| 5,708,585 A | 1/1998 | Kushion | 364/431.61 |
| 5,713,668 A | 2/1998 | Lunghofer et al. | 374/179 |
| 5,719,378 A | 2/1998 | Jackson, Jr. et al. | 219/497 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 347/2 |
| 5,752,008 A | 5/1998 | Bowling | 395/200.2 |
| 5,764,891 A | 6/1998 | Warrior | 395/200.2 |
| 5,781,878 A | 7/1998 | Mizoguchi et al. | 701/109 |
| 5,801,689 A | 9/1998 | Huntsman | 345/329 |
| 5,805,442 A | 9/1998 | Crater et al. | 364/138 |
| 5,828,567 A | 10/1998 | Eryurek et al. | 700/79 |
| 5,828,876 A | 11/1998 | Schwartz et al. | 374/1 |
| 5,848,383 A | 12/1998 | Yuuns | 702/102 |
| 5,859,964 A | 1/1999 | Wang et al. | 395/185.01 |
| 5,876,122 A | 3/1999 | Yuuns | 374/183 |
| 5,887,978 A | 3/1999 | Lunghofer et al. | 374/179 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 6,016,706 A | 1/2000 | Yamamoto et al. | 9/6 |
| 6,017,143 A | 1/2000 | Eryurek et al. | 700/51 |
| 6,119,047 A | 2/2000 | Eryurek et al. | 700/28 |
| 6,045,260 A | 4/2000 | Schwartz et al. | 374/183 |
| 6,047,220 A | 4/2000 | Eryurek et al. | 700/28 |

| | | | |
|---|---|---|---|
| 6,047,222 A | 4/2000 | Burns et al. | 700/79 |
| 6,192,281 B1 | 2/2001 | Brown et al. | 700/2 |
| 6,195,591 B1 | 2/2001 | Nixon et al. | 700/83 |
| 6,199,018 B1 | 3/2001 | Quist et al. | 702/34 |

FOREIGN PATENT DOCUMENTS

| | | |
|---|---|---|
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 5-122768 | 5/1993 |
| JP | 62-42192 | 9/1994 |
| JP | 7-63586 | 3/1995 |
| JP | 72-34988 | 9/1995 |
| JP | 8-54923 | 2/1996 |
| JP | 8-136386 | 6/1996 |
| JP | 8-166309 | 6/1996 |
| JP | 82-47076 | 9/1996 |
| JP | 2712625 | 10/1997 |
| JP | 2712701 | 10/1997 |
| JP | 27-53592 | 3/1998 |
| JP | 72-25530 | 5/1998 |
| JP | 10-232170 | 9/1998 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO98/13677 | 4/1998 |
| WO | WO 98/20469 | 5/1998 |
| WO | WO 00/70531 | 11/2000 |

OTHER PUBLICATIONS

"A Microcomputer–Based Instrument for Applications for Applications in Platinum Resistance Thermomty," by H. Rosemary Taylor and Hector A. Navarro, Journal of Physics E. Scientific Instrument, vol. 16, No. 11, pp. 1100–1104 (1983).
"Experience in Using Estelle for the Specification and Verification of a Fieldbus Protocol: FIP," by Barretto et al., Computer Networking, pp. 295–304 (1990).
"Computer Simualtion of H1 Field Bus Transmission," by Utsumi et al., Advances in Instrumentation and Control, vol. 46, Part 2, pp. 1815–1827 (1991).
"Progress in Fieldbus Developments for Measuring and Control Application," by A. Schwaier, Sensor and Acuators, pp. 115–119 (1991).
"Ein Emulationsystem zur Leistungsanalyse von Feldbussystemen, Teil 1," by R. Hoyer, pp. 335–336 (1991).
"Simulatore Integrato: Controllo su bus di campo," by Barbino et al., Automazione e Strumentatzione, pp. 85–91 (Oct. 1993).
"Ein Modulares, verteiltes Diagnose–Expertensystem für die Fehlerdiagnose in lokalen Netzen," by Jürgen M. Schröder, pp. 557–565 (1990).
"Fault Diagnosis of Fieldbus Systems," by Jürgen Quade, pp. 577–581 (Oct. 1992).
"Ziele und Anwendungen von Feldbussystemen," by T. Pfeifer et al. pp. 549–557 (Oct. 1987).
"PROFIBUS–Infrestrukturmassnahmen," by Tilo Pfeifer et al., pp. 416–419 (Aug. 1991).
"Simulation des Zeitverhaltens von Feldbussystemen," by O. Schnelle, pp. 440–442 (1991).
"Modélisation et al simulation d'un bus de terrain: FIP," by Song et al., pp. 5–9 May 2001.
"Feldbusnetz für Automatisierungssysteme mit intelligenton Funktionseinheiten," by W. Kriesel et al., pp. 486–489 (1987).
"Bus de campo para la inteconexión del proceso con sistemas digitales de control," Technologia, pp. 141–147 (1990).
"Dezentrale Installation mit Echtzeit–Feldbus," Netwerke, Jg. Nr.3 v. 14.3. 4 pages (1990).
"Process Measurement and Analysis," by Liptak et al., Instrument Engineers' Handbook, Third Edition, pp. 528–530, (1995).
"A TCP\IP Tutorial" by, Socolofsky et al. Spider Systems Limited, Jan. 1991 pp. 1–23.
"Approval Standards For Exposionproof Electrical Equipment General Requirements",Factory Mutual Research, Cl. No. 3615, Mar. 1989, pp. 1–34.
"Approval Standards Intrinsically Safe Aparratus and Associated Apparatus For Use In Class I, II, and III, Division 1 Hazardous (Classified) Locations",Factory Mutual Research, Cl. No. 3610, Oct. 1988, pp. 1–70.
"Automation On–Line" by, Phillips et al., Plant Services, Jul. 1997, pp. 41–45.
"Climb to New Heights by Controlling your PLCs Over the Internet" by Phillips et al., Intech, Aug. 1998, pp. 50–51.
"CompProcessor For Piezoresistive Sensors" MCA Technologies Inc. (MCA7707), pp. 1–8, Apr. 2001.
"Ehternet emerges as viable,inexpensive fieldbus", Paul G. Schreier, Personal Engineering, Dec. 1997, pp. 23–29.
"Ehthernet Rules Closed–loop System" by, Eidson et al., Intech, Jun. 1998, pp. 39–42.
"Fieldbus Standard for Use in Industrial Control Systems Part 2: Physical Layer Specification and Service Definition", ISA–S50–Feb. 1992, pp. 1–93.
"Fieldbus Standard for Use in Industrial Control Systems Part 3: Data Link Service Definition", ISA–S50–.Feb. 1997, Part 3 , Aug. 1997, pp. 1–159.
"Fieldbus Standard for Use in Industrial Control Systems Part 4: Data Link Service Definition", ISA–S50.Feb. 1997, Part 4, Aug. 1997, pp. 1–148.
"Fieldbus Support For Process Analysis" by, Blevins et al., Fisher–Rosemount Systems, Inc., 1995, pp. 1–23.

"Hypertext Transfer Protocol —HTTO/1.0" by Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internets Technology Adoption into Automation" by, Fondl et al., Automation Business, pp. 1–5, Apr. 2001.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, computer Scienc Facilities Group, Rutgers University, Oct. 3, 1988, pp. 1–97.

"Is There A Future For Ethernet in Industrial Control?", Micolot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Microkernel Links GUI and Browser For Embedded Web Devices" by, Tom Williams,pp. 1–2, Apr. 2001.

"PC Software Gets Its Edge From Windows, Components, and the Internet", Wayne Lab, I&CS, Mar. 1997, pp. 23–32.

Proceedings Sensor Expo, Aneheim, California, Produced by Expocon Management Associates, Inc., Apr. 1996, pp. 9–21.

Proceedings Sensor Expo, Boston, Massachuttes, Produced by Expocon Managemnet Associates, Inc. May 1997, pp. 1–416.

"Smart Sensor Network of the Furure" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statiscal Process Control for a Glass Tank Ingredient Scale," by R. A. Weisman, *IFAC real Time Programming*, 1985, pp. 29–38.

"The Performance of ControlCharts for Monitoring Process Variation," C. Lowry et al., *COMMUN. STATIS. –SIMULA.*, 1995, pp. 40–437.

"A Knowlegde–Based Approach for Detection and Diagnosis of Out–Of–Control Events in Manufacturing Processes," by P. Love et al., *IEEE*, 1989, pp.736–741.

"Advanced Engine Diagnostics Using Universal Process Modeling", by P O'Sullivan, *Presented at the 1996 SAE Conference on Future Transportation Technology*, pp. 1–9, Apr. 2001.

Parallel, Fault–Tolerant Control and Diagnostics System for Feedwater Regulation in PWRS, by E. Eryurek et al., *Proceedings of the American Power Conference*, Apr. 2001.

"Programmable Hardware Architectures for Sensor Validation", by M. P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M. P. Henry, *Department of Engineering Science, Oxfrd University*, Apr. 2001.

"Smart Temperature Mearsurement in the '90", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M. P. Henry et al., *Report No. QUEL 1884/1891*, (1991).

"Taking Full Advantage of Smart Transmitter Technology Now," by G. Orrison, *Control Engineering*, vol. 42, No. 1, Jan. 1995.

"Using Artifical Neural Networks to Identify Nuclear Power Power Plant States," by Israel E. Alguindigue et al., pp. 1–4, Apr. 2001.

"Application of Neural Computing Paradigms for Signal Validation," by B. R. Upadhyaya et al., *Department Nuclear Engineering*, pp. 1–18, Apr. 2001.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Charaterization for Sensor Failure Detection," by B. R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C. ", by M. J. de Groot et al., *CAL LAB*, Jul./Aug. 1996, pp. 38–41.

"Survey Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," T. V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometry ," by R. L. Shepard et al., Apr. 1992.

"Tuned–Circuits Johnson Noise Thermometry," by Micahel Roberts et al., *7th Symposium on Space Nuclear Power Systems*, Jan. 1990.

"Smart Field Devices Provide New Process Dara, Increase System Flexibility," by Mark Boland, *I&CS*, Nov. 1994, pp. 45–51.

"Wavelet Analysis of Vibration, Part I: Theory[1]," by D. E. Newland, *Journal of Vibration and Acoustics*, vol. 116, Oct. 1994, pp. 409–416.

"Wavelet Analysis of Vibration, Part 2: Wavelet Maps," by D. E. Newland, *Journal of Vibration and Acoustics*, vol. 116, oct. 1994, pp. 417–425.

"Development of Long–Life, High Reliability Remotly Operated Johnson Noise Thermometer," R. L. Shepard et al., *ISA*, 1991, pp. 77–84.

"Application of Johnson Noise Thermometry to Space Nuclear Reactors," by M. J. Roberts et al., *Presented at the 6th Symposium on Space Nuclear Power Systems*, Jan. 9–12, 1989.

"A Decade of Progress in High Temperature Jonson Noise Thermometry," by T. V. Blalock et al., *american Institute of Physics*, 1982 pp.1219–1223.

"Sensor and Device Diagnostics for Predictive and Proactive Maintenance", by B. Boynton,*A Paper Presented at the Electric Power Research Institute –Fossil Plant Maintainence Conference* in Baltimore, Maryland, Jul. 29–Aug. 1, 1996, pp. 50–1 –50–6.

"Detection of Hot Spots in Thin Metal Films Using an Ultra Sensitive Dual Channel Noise Measurement System," by G. H. Massiha et al., *Energy and Information Technologies in the Southeast*, vol. 3 of 3, Apr. 1989, pp. 1310–1314.

"Detecting Blockage in Process Connections of Differential Pressure Transmitter", by E. Taya et al., *SICE*, 1995, pp. 1605–1608.

"Development and Application of Neural Network Algorithms For Process Diagnostics," by B. R. Upadyaya et al., *Proceedings of the 29th Conference on Decision and Control*, 1990 pp. 3277–3282.

"Fault–Tolerant Interface for Self–Validating Sensors", by M. P. Henry, *Colloguim*, pp. 3/1–3/2 (Nov. 1990).

"Fuzzy Logic and Artifical Neural Networks for Nuclear Power Plant Applications," by R. C. Berkan et al., *Proceedings of the American Power Conference*. Apr. 2001.

"Fuzzy Logic and Neural Network Applications to Fault Diagnosis ", by P. Frank et al. *International Journal of Approximate Reasoning*, (1997), pp. 68–88.

"Keynote Paper: Hardware Compilation–A New Technique for Rapid Prototyping of Digital Systems–Applied to Sensor Validation", by M. P. Henry, *Control Eng. Practice*, vol. 3, No. 7., pp. 907–924, (1995).

"The Implications of Digital Communications on Sensor Validation", ny M. Henry et al., *Report No. QUEL 1912/92*, (1992).

"In–Situ Response Time Testing of Thermocouples", *ISA*, by H. M. Hashemian et al., Paper No. 89–0056, pp. 587–593, (1989).

"An Integrated Architecture For Signal Validation in Power Plants," by B. R. Upadhyaya et al., *Third IEEE International Symposium on Intelligent Control*, Aug. 24–26, 1988, pp. 1–6.

"Measurement of the Temperature Fluctation in a Resistor Generating 1/F Fluctation," by S. Hashiguchi, *Japanese Journal of Applied Physics*, vol. 22, no. 5, Part 2, May 1983, pp. L284–L286.

"Check of Semiconductor Thermal Resistance Elecments by the Method of Noise Thermomtry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *international Fast Reactor Safety Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C. J. Borkowski et al., *Rev, Sci. Instrum.*, vol. 45, No. 2, (Feb. 1974) pp. 151–162.

"Thermocouple Continually Checker," IBM Technical Disclosure Bulletin, vol. 20, No. 5 pages 1954 (Oct. 1977).

"A Self–Validating Thermocouple," Janice C–Y et al., IEEE Transactions on Control Systems Technology, vol. 5, No.2, pp. 239–253 (Mar. 1997).

"emWare's Releases EMIT 3.0, Allowed Manufactures to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, rosemount Inc. (1997).

Warrior, J., "The Collision Between the Web and Plant Floor Automation," $6^{th}$. WWW Conference Workshop on Embedded Web Technology, Santa Clara, CA (Apr. 7, 1997).

Microsoft Press Computer Dictionart, $3^{rd}$ Edition, page 124, Apr. 2001.

"Internal Statistical Quality Control for Quality Monitoring Instruments", by P. Girlinget al., *ISA*, 15 pp., 1999.

Web Pages from www.triant.com (3 pages), Apr. 2001.

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journa*, by Alex A. Yu et al., vol. 44, No. 5, pp. M475–479, (Sep. – Oct. 1998).

"Caviation in Pumps, Pipes and Valve," *Process Engineering*, by Dr. Ronald Young, pp. 47 and 49 (Jan. 1990).

"Quantification of Heart Valve Caviation Based on High Fidelity Pressure Measurements," *Advances in Bioengineering 1994*, by Laura A. Garrison et al., BED–vol. 28, pp. 297–298 (Nov. 6–11 1994).

"Monitoring and Diagnosis of Caviation in Pumps and Valves Using the Wigner Distribution," *Hydroaccoustic Facilitites, Instrumentation, and ExperimentalTechniques*, NCA–vol. 10, pp. 31–36 (1991).

"Developing Predictive Models for Caviation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp 3/1–3/4 (1999).

* cited by examiner

ERROR COMPENSATION FOR A PROCESS FLUID TEMPERATURE TRANSMITTER

BACKGROUND OF THE INVENTION

The process industry employs process variable transmitters to monitor process variables associated with substances such as solids, slurries, liquids, vapors, and gasses in chemical, pulp, petroleum, pharmaceutical, food and other food processing plants. Process variables include pressure, temperature, flow, level, turbidity, density, concentration, chemical composition and other properties. A process fluid temperature transmitter provides an output related to a sensed process substance temperature. The temperature transmitter output can be communicated over a process control loop to a control room, or the output can be communicated to another process device such that the process can be monitored and controlled In order to monitor a process fluid temperature, the transmitter includes a sensor, such as a resistance temperature device (RTD).

An RTD changes resistance in response to a change in temperature. By measuring the resistance of the RTD, temperature can be calculated. Such resistance measurement is generally accomplished by passing a known current through the RTD, and measuring the associated voltage developed across the RTD.

One source of error in RTD thermometry is due to the presence of non-associated voltages present in the RTD circuit. A non-associated voltage is any voltage in an RTD circuit that is not generated by the flow of a measurement current. Examples of non-associated voltages include voltages due to the Seebeck Effect and galvanic action. Reference may be made to the McGraw-Hill Encyclopedia of Science and Technology, seventh edition.

The Seebeck Effect provides that dissimilar metal junctions create junction voltages due to the union of dissimilar metals in a temperature gradient condition. Thus, the voltage measured across the RTD will include not only the associated voltage corresponding to the current passing through the RTD, but also the non-associated junction voltages as well. If compensation for these non-associated voltages is not provided, measurement error can result.

Non-associated voltages due to the Seebeck Effect are present in many known RTD's. Such RTD's typically have at least one dissimilar metal junction. For example, the sensing portion of an RTD may be constructed from a winding of platinum sensor wire that is electrically coupled to two or more leadwires. The leadwires are generally copper, and can often be plated with nickel. Thus, each junction of sensor wire to leadwire can include a platinum-nickel junction and a nickel-copper junction. Additionally, in some RTD's it is difficult to couple the sensor wire directly to the leadwire and so a transition coupling is used. The transition coupling is often a gold-plated tab to which both the sensor wire and the leadwire are attached. Use of the transition coupling adds additional dissimilar metal junctions. Further, dissimilar metal junctions can also occur where the leadwires couple to transmitter terminals. In some instances such non-associated voltage error can approach 0.5% which is larger than the desired accuracy of 0.1° C. over a 1000° C. span.

Non-associated voltages can also be created by galvanic action within an RTD circuit. For example, in some RTD's the sensing wire is wound around a ceramic core that provides and insulating support for the sensor wire. However, due to impurities in the ceramic, the core will allow some current flow and can thus create an emf (electromotive force) that is a non-associated voltage within the RTD circuit. The error caused by galvanic action can be as large or greater than that caused by the Seebeck effect.

As process fluid temperature measurement has become more accurate, there is an increasing need to identify and compensate for smaller and smaller sources of error such as error due to the non-associated voltages. Such error reduction provides more accurate temperature measurements, resulting in more precise process control and the opportunity for increased efficiency and safety.

SUMMARY OF THE INVENTION

A process fluid temperature transmitter provides a process fluid temperature output that is substantially independent of any non-associated voltage, thus reducing RTD measurement error. The transmitter includes a plurality of terminals that are couplable to a resistance temperature device (RTD) to form a circuit including at least one non-associated voltage source having a non-associated voltage.

DETAILED DESCRIPTION OF THE EMBODIMENTS

Although the present invention will be described with reference to embodiments of process fluid temperature transmitters, and the manner in which non-associated voltage correction is effected, workers skilled in the art will recognize that changes may be made in form and detail without departing from the spirit and scope of the invention, which are defined by the appended claims.

Figure 1:
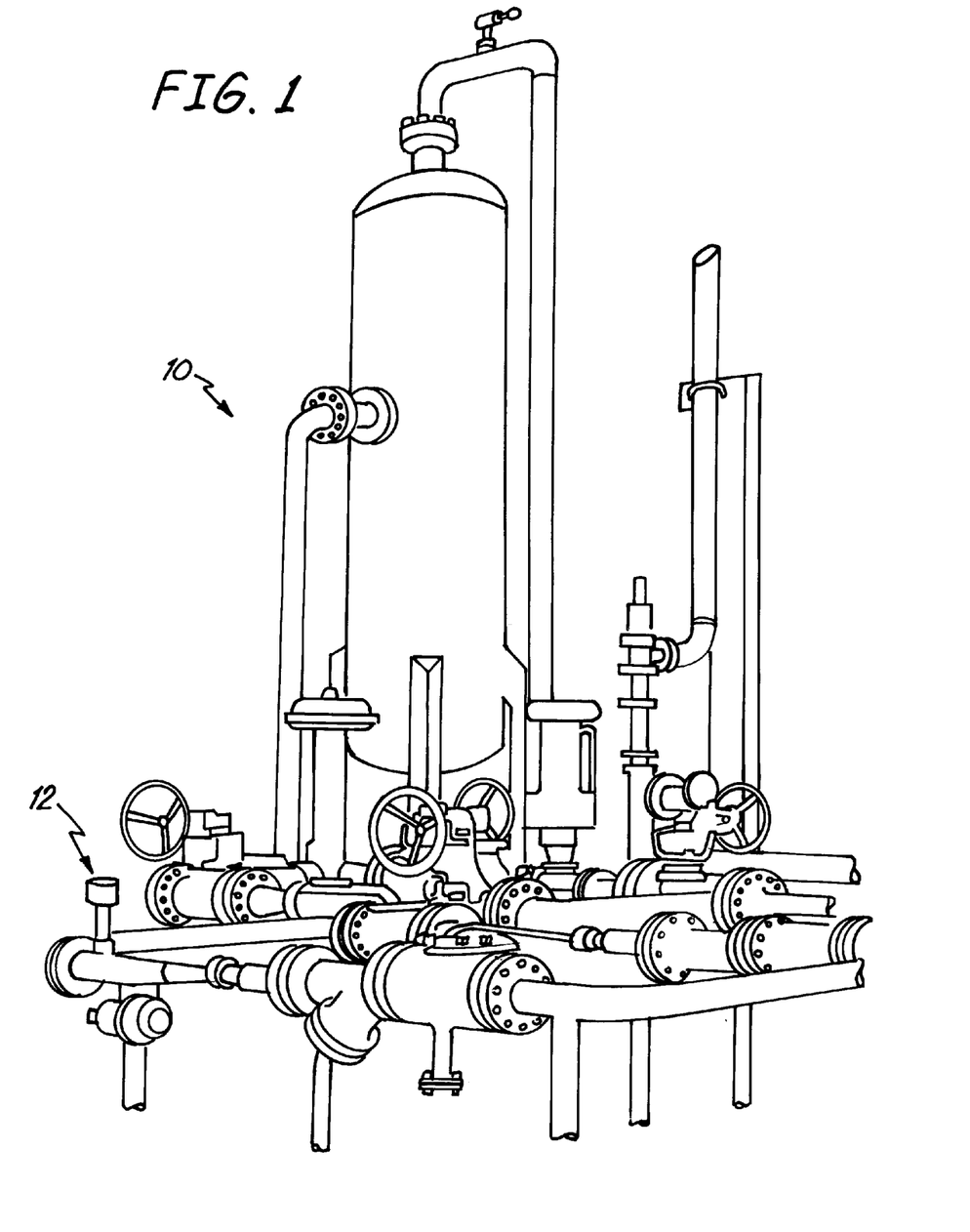
FIG. 1 is a diagram of the environment of a process fluid temperature transmitter.
Figure 2:
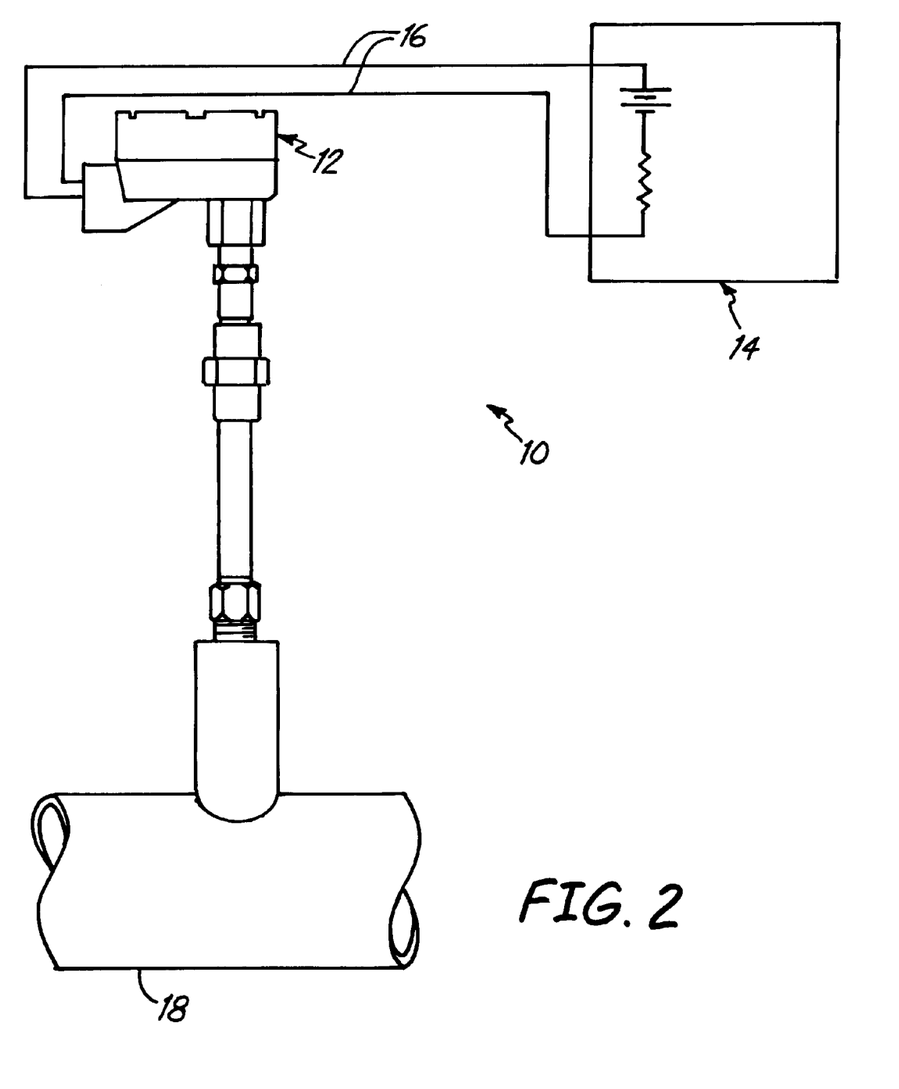
FIG. 2 is a diagrammatic view of process fluid temperature transmitter 12.

FIGS. 1 and 2 illustrate the environment of a process fluid temperature transmitter in accordance with embodiments of the invention. FIG. 1 shows process fluid control system 10 including process fluid temperature transmitter 12. FIG. 2 illustrates process control system 10 including process fluid temperature transmitter 12 electrically coupled to control room 14 (modeled as a voltage source and resistance) over a process control loop 16. Transmitter 12 is mounted on and coupled to a process fluid container such as pipe 18. Transmitter 12 monitors the temperature of process fluid in process pipe 18 and transmits temperature information to control room 14 over loop 16.

Figure 3:
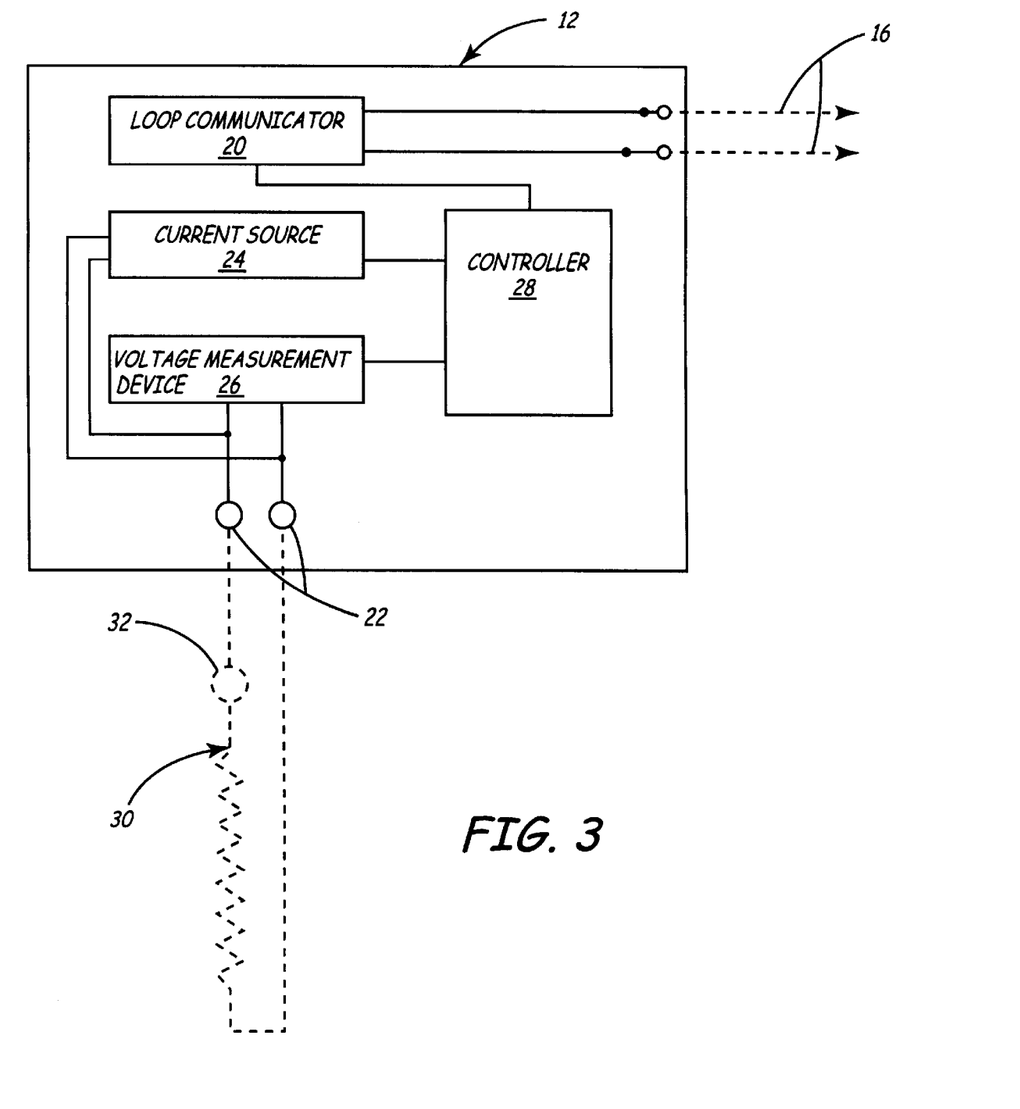
FIG. 3 is a system block diagram of a process fluid temperature transmitter.

FIG. 3 is a system block diagram of process fluid transmitter 12 in accordance with an embodiment of the invention. Process fluid temperature transmitter 12 includes loop communicator 20, a plurality of terminals 22, current source 24, voltage measurement device 26, and controller 28.

Loop communicator 20 is couplable to process control loop 16 (shown in phantom) and is adapted to communicate over process control loop 16. Process control loop 16 is any physical configuration that is capable of passing signals related to process information. For example, process control loop 16 can be a two-wire, 4–20 mA process control loop. A process variable transmitter coupled to such a process control loop controls the amount of current flowing through the loop such that the current corresponds to the process variable. In some process control loop embodiments, the energization levels are low enough to comply with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988. Some process variable transmitters can operate on such low energy levels that they can receive all required electrical power from a 4–20 mA process control loop.

Loop communicator 20 can include a 4–20 mA communication section for analog communication. For digital signals, communicator 20 can include a Highway Addressable Remote Transducer (HART®) communication section, a FOUNDATION™ Fieldbus communication section, or any other appropriate section such as a Profibus section, a Controller Area Network (CAN) section, a DeviceNet section, or a Lonworks section. Additionally, various sections can be included together. For example, a 4–20 mA section can be combined with a HART® section to provide both analog and digital communication. Thus, loop communicator 20 is adapted for bi-directional communication over process control loop 16 according to one or more selected protocols in a known manner.

Process control loop 16 can comprise any operable number of conductors. For example, process control loop 16 can be a two-, three-, or four-conductor process control loop. The conductors themselves can be electrical wires, or fiber-optic media. Further, if a wireless process control loop is to be used (such as an infrared (IR) loop or a radio-frequency (RF) loop) then the conductors can be omitted and the adaptation of loop communicator 20 for such wireless communication can be effected in a known manner.

FIG. 3 shows a pair of terminals 22 coupled to a resistance temperature device, such as RTD 30 (shown in phantom in FIG. 3). Although FIG. 3 shows a pair of terminals 22, any appropriate number of terminals can be used to couple to RTD 30. RTD 30 can be separate from transmitter 12 (as shown) or included within transmitter 12. Terminals 22 are couplable to RTD 30 to form a circuit having at least one non-associated voltage source 32 that has a non-associated voltage.

Current source 24 is operably coupled to terminals 22 and is adapted to pass a measurement current through the plurality of terminals. Passing a known measurement current through an unknown resistance causes an associated voltage drop across the resistance that is indicative of the resistance. Current source 24 is shown in block form, and can be any current source that provides a known current output. Thus, current source 24 can include an unknown current source adapted to pass its current through a known resistor such that the current can be known. Alternately, current source 24 can be a known semiconductor current source or any other appropriate current source.

Voltage measurement device 26 is coupled to terminals 22 and is adapted to provide a voltage value indicative of a voltage across terminals 22 including the non-associated voltage of the at least one non-associated voltage source 32, which can be a dissimilar metal junction. Voltage measurement device 26 can be an analog to digital converter, or any other appropriate device capable of measuring the voltage across terminals 22. If such measurement is performed while current source 24 is passing the measurement current through RTD 30, then the voltage measured will be related to the resistance of RTD 30, and thus the process fluid temperature.

Controller 28 is coupled to voltage measurement device 26 and loop communicator 20. Controller 28 is adapted to provide a process temperature output value to loop communicator 20 for communication over process control loop 16. One aspect of embodiments of the invention is the removal of non-associated voltage effects from the process temperature output. The process temperature output value is related to the measured resistance of the RTD and substantially independent of the non-associated voltage of the at least one non-associated voltage source. Controller 28 can be a programmable gate array, microprocessor, or any other suitable device that can reduce the effects of the non-associated voltage. Such error reduction can be effected mathematically or with appropriate circuitry, or through a combination of the two.

Figure 4:
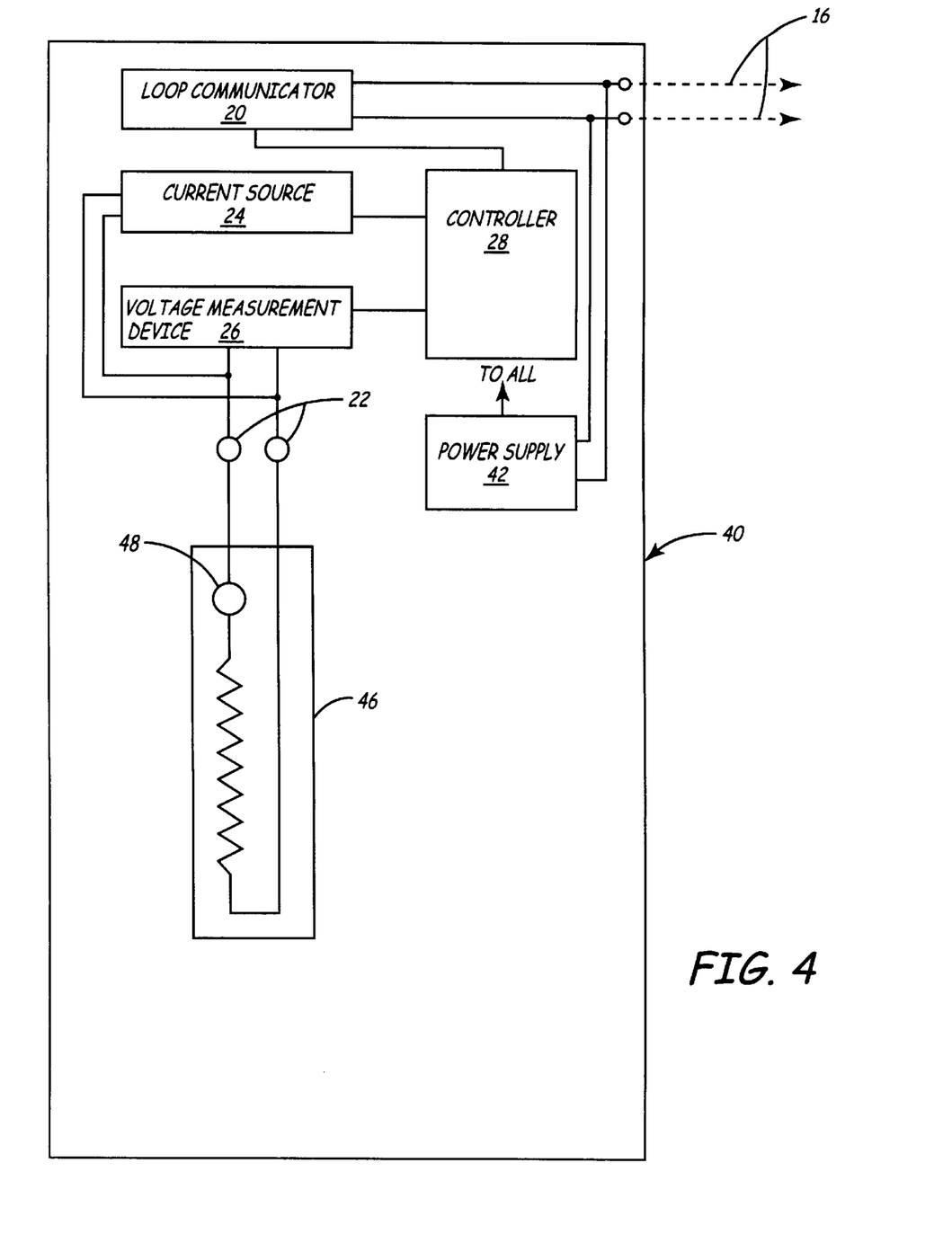
FIG. 4 is a system block diagram of a process fluid temperature transmitter.
Figure 5:
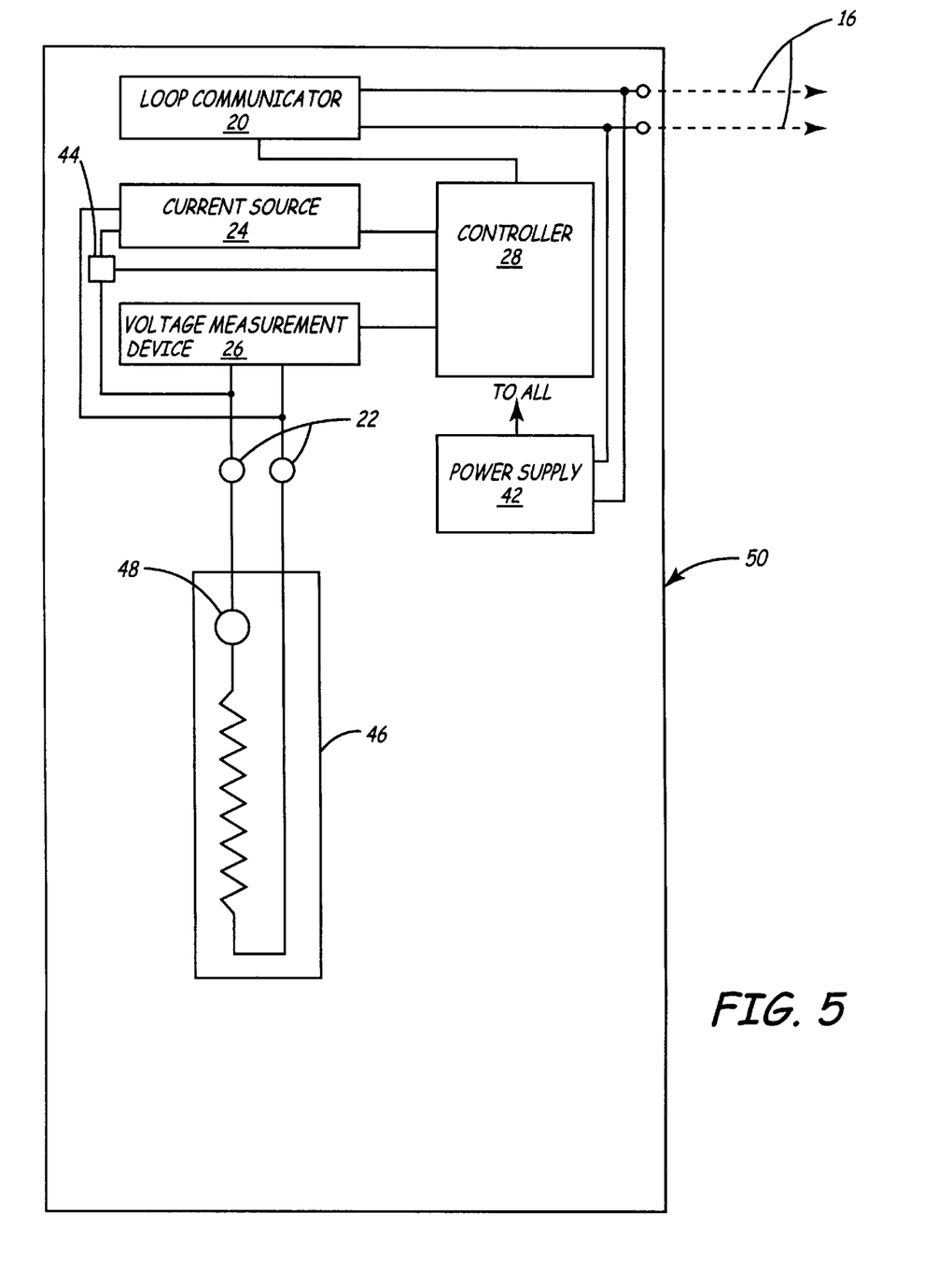
FIG. 5 is a system block diagram of a process fluid temperature transmitter.
Figure 6:
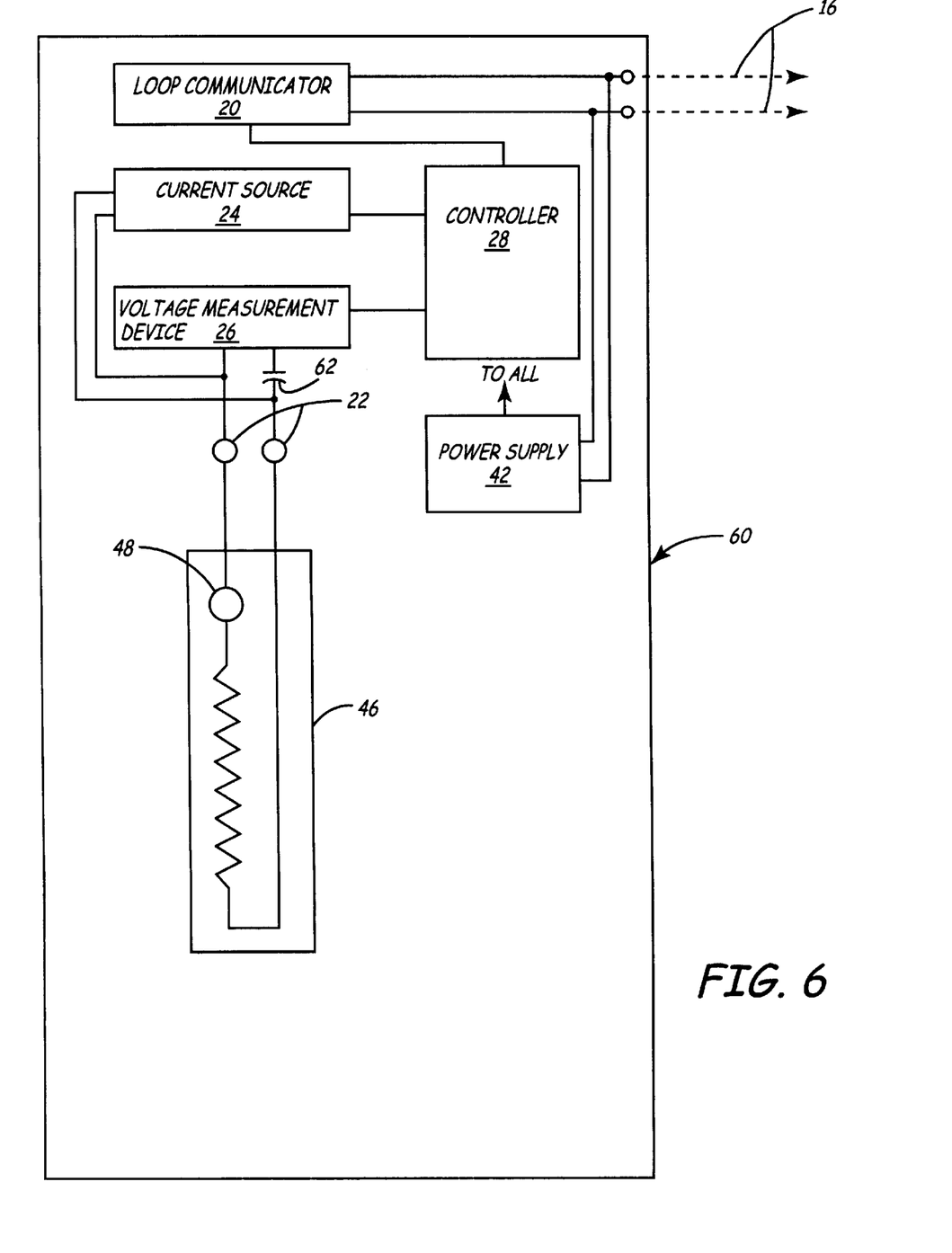
FIG. 6 is a system block diagram of a process fluid temperature transmitter.

FIGS. 4, 5 and 6 are system block diagrams of process fluid temperature transmitters 40, 50 and 60, respectively. Transmitters 40, 50, and 60 include many of the same components as transmitter 12 (shown in FIGS. 2 and 3) and like components are numbered similarly.

Power supply 42, like loop communicator 20, is couplable to process control loop 16. Power supply 42 is adapted to receive power from process control loop 16 and provide the received power to the various components within transmitters 40, 50 and 60 as indicated by the arrow labeled "TO ALL." Thus, transmitters 40, 50 and 60 can be wholly powered with power received from process control loop 16. Additionally, such loop powered transmitters can be intrinsically safe, and be couplable to two, three, or four-wire process control loops.

Controller 28 of transmitter 40 is coupled to current source 24. Controller 28 can thus control measurement current flow through RTD 46. In a first 15 state, measurement current flows through RTD 46 and the voltage value provided by voltage measurement device 26 is indicative of both RTD resistance and the voltage of non-associated voltage source 48. In a second state, controller 28 issues an inhibit signal to current source 24 such that the measurement current is stopped. During the second state, controller 28 receives an error value from voltage measurement device 26, which value is substantially solely indicative of the voltage of non-associated voltage source 48. By subtracting the error value from the voltage value measured during the first state, controller 28 calculates a process temperature output which is substantially independent of non-associated voltage. The output is provided to loop communicator 20 for transmission over process control loop 16.

Alternately, controller 28 of transmitter 40 can issue polarity commands to current source 24 instead of the inhibit signal. Thus, in the first state, controller 28 can command that current source 24 provide current through RTD 46 in a first direction. Then, in the second state, controller 28 commands current source 24 to reverse the direction of current flow through RTD 46. Controller 28 then averages the absolute values of the voltage values measured during the first and second states to obtain the compensated process temperature output.

FIG. 5 is a system block diagram of temperature transmitter 50. Controller 28 is coupled to switch 44 instead of current source 24. Thus, instead of controller 28 issuing the inhibit signal directly to current source 24, controller 28 issues the signal to switch 44 which interrupts measurement current flow through RTD 46. Thus, operation of transmitter 50 is very similar to that of transmitter 40, and includes both first and second states, as described with respect to transmitter 40.

FIG. 6 is a system block diagram of process fluid temperature transmitter 60 showing another embodiment of the invention. Transmitter 60 is similar to transmitter 50 (shown in FIG. 5) except that transmitter 60 does not include switch 44, but includes capacitor 62 interposed within the RTD circuit. In this embodiment, current source 24 provides an alternating measurement current. Capacitor 62 is appropriately selected to pass signals indicative of the measurement current, while isolating voltage measurement device 26 from direct current (DC) voltage. Since the voltage of non-associated voltage source 48 is substantially fixed (DC) in comparison to the associated voltage created by the alternating measurement current flowing though RTD 46, the non-associated voltage will be essentially filtered from the measurement provided by voltage measurement device 26. Thus, in this embodiment, controller 28 need not perform any compensation on the process temperature output value.

Figure 7:
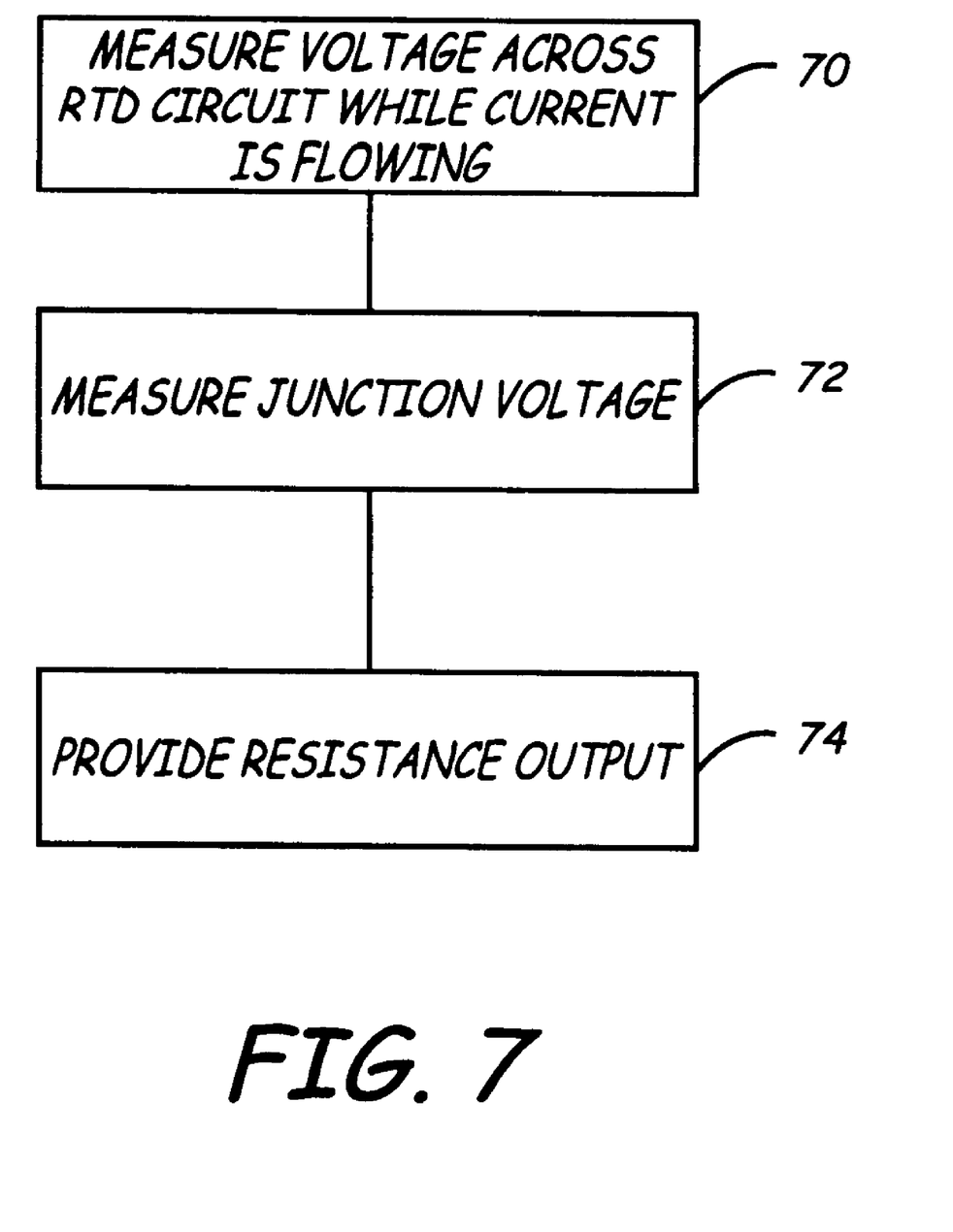
FIG. 7 is a flowchart of a method performed in accordance with an embodiment of the invention.

FIG. 7 is a flowchart of a method performed in accordance with an embodiment of the invention. This method can also be embodied in computer instructions stored on computer-readable media. The method begins at block 70 where a voltage across the RTD circuit is measured while measurement current flows through the RTD circuit. As discussed above, such measurement will contain the associated voltage as well as a component due to any non-associated voltage present in the RTD circuit. At block 72, the non-associated voltage, alone, is measured. This can be done by stopping measurement current flow through the RTD circuit while obtaining a voltage value indicative of voltage across the RTD circuit while no current is flowing. At block 74, the non-associated voltage measured during block 72 is removed from the voltage measured during block 70. and the resultant, compensated process temperature output is provided.

Figure 8:
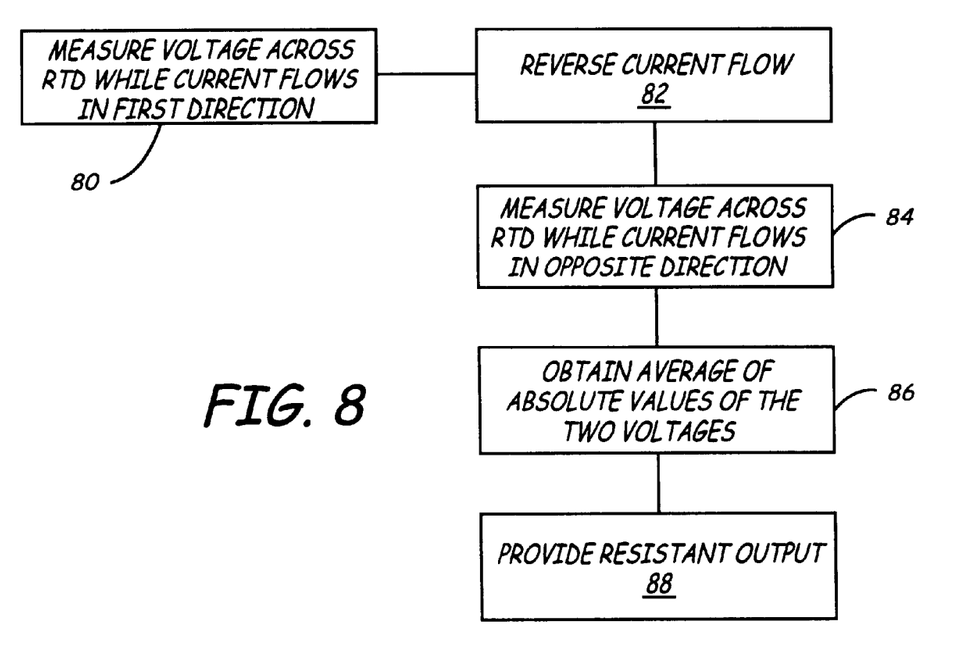
FIG. 8 is a flowchart of a method performed in accordance with another embodiment of the invention.

FIG. 8 is a flowchart of another method performed in accordance with another embodiment of the invention. The illustrated method can also be embodied in computer instructions stored on computer-readable media. The method begins at block 80, where the voltage across an RTD is measured, much like block 70 (shown in FIG. 7). At block 82, the measurement current flow is reversed. At block 84, the voltage across the RTD is measured again. At block 86, the two voltage values are combined mathematically to remove any non-associated voltage, and thus provide a process temperature output value. One example of such mathematical combination includes averaging the absolute values of the two voltage values. This provides a process temperature value that is substantially solely related to RTD resistance, and substantially independent of non-associated voltages such as dissimilar metal junction voltages. At block 88 the compensated process temperature value is provided as an output. In one embodiment, the current flow can be automatically periodically reversed, while in another embodiment, current reversal can occur at selected times based upon input received from a controller or input device.

What is claimed is:

1. A process fluid temperature transmitter with improved error compensation, the transmitter comprising:

a loop communicator couplable to a process control loop and adapted to communicate over the process control loop;

a plurality of terminals couplable to a resistance temperature device to form a circuit including at least one non-associated voltage source having a non-associated voltage;

a current source operably coupled to the plurality of terminals and adapted to pass a measurement current through the plurality of terminals;

a voltage measurement device coupled to the plurality of terminals and disposed to provide a first voltage value indicative of a first voltage across the plurality of terminals including the non-associated voltage; and a controller coupled to the voltage measurement device and the loop communicator, the controller adapted to provide a process temperature value to the loop communicator for communication over the process control loop, the process temperature value related to the first voltage value and substantially independent of the non-associated voltage of the at least one non-associated voltage source.

2. The transmitter of claim 1, wherein:

the current source is adapted to pass the measurement current through the circuit during a first state, and is adapted to pass substantially no current through the circuit during a second state;

the voltage measurement device is adapted to provide the first voltage value during the first state, and to provide an error value related to the non-associated voltage of the at least one non-associated voltage source during the second state; and the controller is adapted to subtract the error value from the first voltage value to provide the process temperature value.

3. The transmitter of claim 2, wherein all circuitry within the transmitter is adapted for intrinsic safety compliance.

4. The transmitter of claim 2, wherein the at least one non-associated voltage source comprises a plurality of non-associated voltage sources.

5. The transmitter of claim 2, wherein the controller is coupled to the current source and is adapted to stop measurement current flow through the circuit and wherein the voltage measurement device is adapted to measure the error value while the measurement current is stopped.

6. The transmitter of claim 2, and further comprising a switch coupled to the controller and electrically interposed between the current source and the plurality of terminals to selectively inhibit measurement current flow in response to an inhibit signal from the controller.

7. The transmitter of claim 2, wherein the loop communicator is adapted to communicate in accordance with a protocol selected from the group consisting of HART®, FOUNDATION™ Fieldbus, Profibus, DeviceNet, CAN, and Lonworks.

8. The transmitter of claim 2, and further comprising a resistance temperature device coupled to the plurality of terminals, the resistance temperature device having a resistance that varies with a temperature of the resistance temperature device.

9. The transmitter of claim 8, wherein the resistance temperature device is constructed from a material selected from the group consisting of nickel and platinum.

10. The transmitter of claim 1, and further comprising a power supply couplable to the process control loop and adapted to receive power from the process control loop to wholly power the transmitter with power received from the process control loop.

11. The transmitter of claim 10, wherein the loop communicator is adapted to communicate over a 4–20 mA process control loop.

12. The transmitter of claim 1, wherein the process control loop includes a plurality of conductors ranging between 2 conductors and 16 conductors, inclusive.

13. The transmitter of claim 1, wherein the measurement current is an alternating current, and wherein the circuit includes at least one capacitor adapted to substantially pass a signal indicative of the alternating measurement current.

14. The transmitter of claim 1, wherein:

the measurement current is an alternating current, and the voltage measurement device is adapted to provide a second voltage value indicative of current flowing through the circuit; and wherein the first and second voltage values are indicative of current flow through the circuit in opposite directions, and the process temperature value is related to the first and second voltage values.

15. The transmitter of claim 14, wherein the process temperature value is related to an average of absolute values of the first and second voltage values.

16. The transmitter of claim 1, wherein the at least one non-associated voltage source is a dissimilar metal junction.

17. A process fluid temperature transmitter with improved error compensation, the transmitter comprising:

means coupleable to a process control loop for communicating over the process control loop;

means for coupling to a resistance temperature device to form a circuit having a plurality of terminals and at least one non-associated voltage source having a non-associated voltage;

means for passing a measurement current through the means for coupling;

means for providing a first voltage value indicative of a first voltage across the plurality of terminals; and means for providing a process temperature value to the means for communicating, the process temperature value being related to the first voltage value and substantially independent of the non-associated voltage.

18. A method of measuring process fluid temperature with a process fluid temperature transmitter with improved error compensation, the method comprising:

measuring a voltage across a resistance temperature device in a resistance temperature device circuit while a known measurement current flows through the circuit;

measuring a non-associated voltage within the circuit while the current flows through the circuit generated by at least one non-associated voltage source; and providing a transmitter output indicative substantially solely of a resistance of the resistance temperature device circuit, and substantially independent of the non-associated voltage.

19. Computer-readable media storing a computer program comprising:

first measurement instructions for obtaining a voltage value indicative of a voltage across a resistance temperature device in a resistance temperature device circuit while a known measurement current flows through the circuit;

second measurement instructions for obtaining a non-associated voltage within the circuit while the current flows through the circuit generated by at least one non-associated voltage source; and output instructions for providing a transmitter output indicative substantially solely of a resistance of the resistance temperature device circuit, the output being substantially independent of the non-associated voltage.

* * * * *

UNITED STATES PATENT AND TRADEMARK OFFICE
CERTIFICATE OF CORRECTION

PATENT NO. : 6,356,191 B1
DATED : March 12, 2002
INVENTOR(S) : Kirkpatrick et al.

It is certified that error appears in the above-identified patent and that said Letters Patent is hereby corrected as shown below:

<u>Title page,</u>
Item [56], References Cited, U.S. PATENT DOCUMENTS,
Replace "5,268,311    12/1993    Kirchner et al. ……... 128/672"
with -- 5,269,311    12/1993    Kirchner et al. ……... 128/672 --

Replace "6,119,047    2/2000    Eryurek et al. ……... 700/28"
with -- 6,119,047    9/2000    Eryurek et al. ……... 700/28 --

Signed and Sealed this

Third Day of September, 2002

Attest:

Attesting Officer

JAMES E. ROGAN
*Director of the United States Patent and Trademark Office*